June 25, 1940.    M. B. HEFTLER ET AL    2,205,559
LUBRICATOR
Filed June 4, 1938    2 Sheets-Sheet 1

PARKER G. COX
MAURICE BEN HEFTLER
INVENTORS.

BY A. R. McCrady
ATTORNEY.

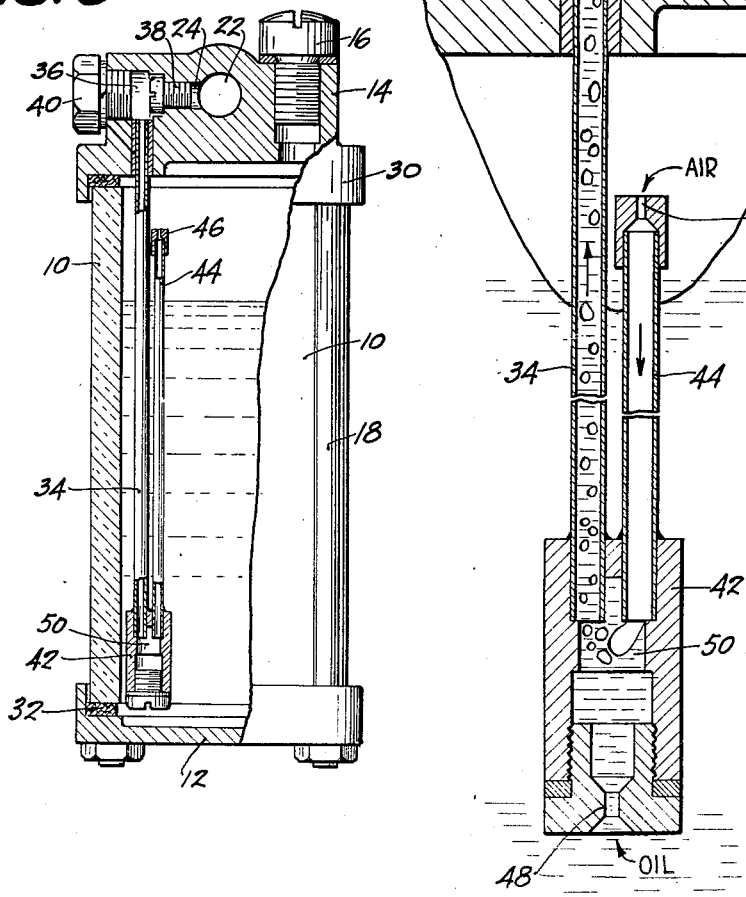

Patented June 25, 1940

2,205,559

UNITED STATES PATENT OFFICE 2,205,559

LUBRICATOR

Maurice Ben Heftler and Parker G. Cox, Detroit, Mich., assignors to Zenith Carburetor Company, Detroit, Mich., a corporation of Michigan Application June 4, 1938, Serial No. 211,783

10 Claims. (Cl. 184—55)

This invention relates to lubricating apparatus, and is particularly designed for the lubrication of devices such as pneumatic hammers which are driven by compressed air. Due to the conditions of operation and the construction of such devices, it is advantageous to lubricate them by adding to the compressed air or other motive fluid supplied thereto a continuous stream of lubricant in the form of a spray which is atomized into the motive fluid so as to carburet the same.

The present invention provides means for accomplishing this purpose, by utilizing a pressure differential existing at spaced points in the compressed air passage, and by utilizing the energy of the flowing air to atomize the lubricant so as to maintain it in suspended condition until it is deposited upon the moving parts of the pneumatic hammer or other device.

An object of the invention is to provide a lubricating apparatus wherein a constant quantity of oil will flow in proportion to a constant air flow independently of the oil level in the reservoir.

Another object of the invention is to provide a lubricating apparatus responsive to pressure differential within the compressed air passage, wherein the lubricant is atomized by the flowing air and kept in a suspended condition until the lubricant is deposited upon the moving parts of the driven device.

A still further object of the invention is to provide means for preventing back-flow of oil from the oil reservoir to the air conduit upon sudden drop of pressure within the conduit.

Other objects and desirable particular constructions and arrangements of parts will become apparent upon reference to the following detailed description of the illustrative embodiment shown in the accompanying drawings, in which:

Figure 3 is a vertical section taken on line 3—3 of Figure 1; and

Figure 4 is a fragmentary sectional view showing on an enlarged scale the calibrated oil and air orifices of the apparatus.

Figure 1:
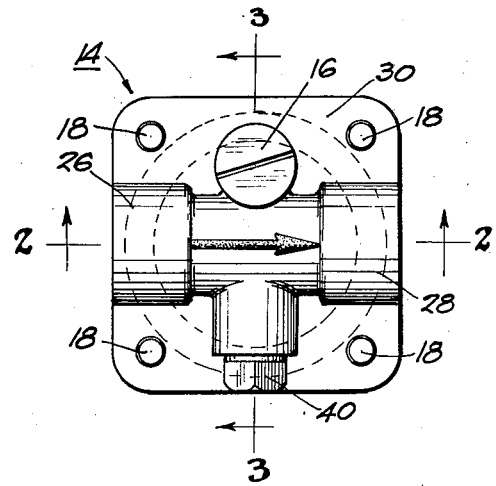
Figure 1 is a plan view of a device embodying the invention.
Figure 2:
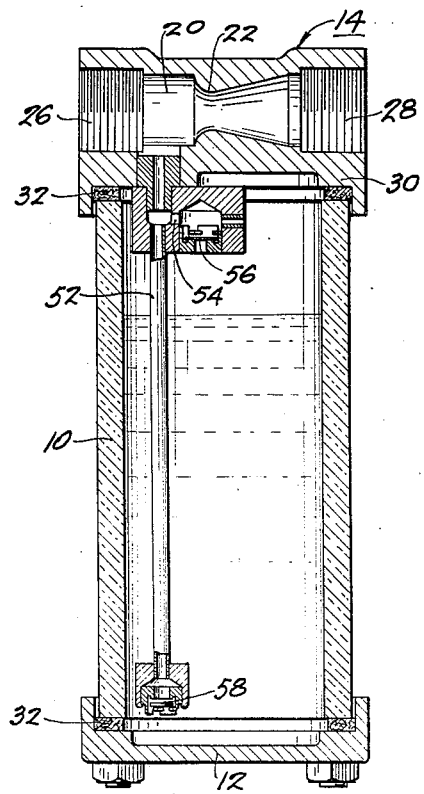
Figure 2 is a vertical section taken on line 2—2 of Figure 1.

Referring more particularly to the drawings, the device is seen to comprise a reservoir for liquid lubricant, formed principally by a transparent glass cylinder 10 provided with a bottom closure 12 and having a head 14 mounted thereon. The head is constructed with a filling passage fitted with a plug 16 for purposes of replenishing the oil supply in the reservoir. The head 14, cylinder 10, and bottom closure 12 are secured together by means such as bolts 18.

A passage 20 for compressed air to be carbureted extends transversely of the head 14 and is provided with a Venturi throat 22 into which a lubricant jet 24 discharges. The compressed air enters from a pump or other source of pressure through an inlet 26, and leaves through an outlet 28 to pass to the device to be driven thereby. The base 30 of the head 14 forms a cover for the reservoir, suitable gaskets 32 being provided to prevent leakage.

A conduit 34 for lubricant leads from a point near the bottom of the reservoir 10 to a passage 36 which communicates by way of a calibrated plug 38 with the jet 24. The passage 36 is closed by means of a threaded plug 40. Secured to the lower end of conduit 34 is a cylinder 42 which also receives the lower end of an air tube 44 which extends above the lubricant level and terminates in a calibrated restriction 46. The lower end of cylinder 42 is closed by a threaded plug provided with a calibrated restriction 48 through which the interior chamber 50 of the cylinder communicates with the lubricant in the reservoir.

Anterior to the Venturi throat 22 an air supply conduit 52 extends from the passage 20 to a point adjacent the bottom of the reservoir 10, transmitting to the reservoir a pressure which varies with the pressure in the passage 20 and which forces lubricant to flow upwardly through restriction 48 and conduit 34 at a rate approximately proportionate to the velocity of the compressed air in the passage.

Oil under pressure in the reservoir 10 passes through the restriction 48 to the chamber 50 where it is emulsified with air entering the chamber by way of the calibrated orifice 46 and air tube 44. The emulsified lubricant passes up the conduit 34, through the calibrated plug 38, and is discharged by the jet 24 to the Venturi throat 22.

The orifices 46, 48 and 38 are so calibrated and proportioned that constant lubricant flow will occur with constant air flow in the passage independently of variations in the lubricant level, and upon an increase in velocity of the air flow in the passage a proportionate increase in flow of lubricant results independently of the lubricant level.

To prevent the compressed air above the lubricant level in the reservoir from forcing lubricant out of the reservoir when the pressure in the passage is suddenly shut off, a by-pass conduit 54 is provided connecting conduit 52 with the reservoir above the lubricant level. This by-pass conduit is provided with a gravity seated check valve 56 which normally remains closed but upon sudden release of pressure in passage 20 is moved off its seat by the pressure of the air in the reservoir to allow the same to discharge through the tube 52.

In apparatus of this type a certain amount of pulsation in the air line is likely to occur, and such pulsation causes a pulsation of pressure in the air above the lubricant level. Because the check valve 56 is incapable of opening rapidly enough to allow for these pulsations, lubricant tends to be forced up the conduit 52. To overcome this undesirable condition another check valve 58 is provided for the bottom end of the conduit 52. The air pressure in the passage entering the reservoir keeps the valve 58 open but as soon as pulsations occur the valve 58 closes the end of the conduit and prevents back flow of the lubricant.

In the operation of the device, the reservoir 10 is filled with lubricant to a point below the orifice 46 of the air tube 44. When the air driven tool is put into operation the device begins to feed oil in proportion to the velocity of flow through the venturi 22. As the velocity increases, the depression developed by the venturi increases, feeding a greater amount of lubricant through jet 24 to the Venturi throat 22. Due to the high velocity of air at the Venturi throat the lubricant, even though it may be of relatively high viscosity, will be atomized and carried along by the stream of air in suspended condition to be deposited upon the moving parts of the air driven tool.

The rate of discharge of lubricant through the jet 24 will be proportional to the rate of air flow through conduit 52, and since such air passes upwardly through the body of the lubricant in the form of bubbles, the operator can at any time ascertain the rate of discharge of the lubricant by viewing the bubbles through the transparent cylinder 10.

In order to avoid the possibility of the device being connected into the pressure line in the wrong direction, an arrow 60 may be formed on the head 14 pointing in the direction of air flow.

While one illustrative embodiment has been described in detail, it is not our intention to limit the scope of the invention to that particular embodiment or otherwise than by the terms of the appended claims.

We claim:

1. In an apparatus for lubrication, a transparent reservoir for liquid lubricant, a passage for compressed air, a conduit transmitting pressure from the passage to the reservoir below the lubricant level, a discharge jet in the passage, a chamber in the lubricant for emulsification thereof, and a conduit leading from the chamber and feeding the emulsion to the discharge jet.

2. In an apparatus for lubrication, a reservoir for liquid lubricant, a passage for compressed air, a conduit transmitting pressure from the passage to the reservoir, a chamber for emulsification of the lubricant in the reservoir, and a conduit communicating with the reservoir above the lubricant and feeding emulsion thereto.

3. In a lubricating apparatus, a reservoir for liquid lubricant, a passage for air under pressure, a pressure conduit communicating with the passage and leading to the reservoir, a discharge jet in the passage, an auxiliary reservoir for emulsification of the lubricant, and a conduit leading from the auxiliary reservoir and feeding the emulsion to the discharge jet.

4. A lubricating apparatus for compressed air actuated devices, comprising a passage for compressed air, a lubricant reservoir associated therewith, a pressure conduit leading from the passage to the reservoir below the lubricant level, an emulsifying chamber having an air inlet communicating with the reservoir about the lubricant level and an emulsion outlet, and a check valve for the pressure conduit to prevent back flow of lubricant upon sudden pressure drop in the passage.

5. A lubricating apparatus for compressed air actuated devices, comprising a passage for compressed air, a lubricant reservoir associated therewith, a pressure conduit leading from the passage to the reservoir below the lubricant level and having a check valve therein, and an emulsifying chamber having an air inlet and an emulsion outlet, said outlet being in communication with the passage.

6. In a lubricating device having a lubricant reservoir, the combination with a passage for compressed air of a pressure conduit having a check valve at its end communicating with the passage and the reservoir, a chamber for emulsifying the lubricant within the reservoir, and a conduit leading to the passage from the chamber feeding emulsified lubricant thereto.

7. In a lubricating device having an air passage and a lubricant reservoir associated therewith, a pressure conduit communicating with the passage and the reservoir, means including a chamber for emulsifying lubricant drawn from the reservoir, a conduit leading from the chamber to the passage, and a relief valve for the compressed air in the reservoir when the pressure in the passage drops.

8. In a lubricating device having an air passage and a lubricant reservoir associated therewith, a conduit transmitting pressure from the passage to the reservoir below the lubricant level, a chamber within the reservoir feeding lubricant to the passage in proportion to the rate of air flow therethrough, a check valve for the pressure conduit, and a relief valve for the compressed air in the reservoir operative when the pressure in the passage drops.

9. In a lubricating device having a compressed air passage and a lubricant reservoir associated therewith, a conduit transmitting pressure from the passage to the reservoir, a conduit leading from the reservoir to the passage to transmit lubricant thereto, a relief valve to relieve the pressure in the reservoir when the pressure in the passage drops, and a check valve for the pressure conduit.

10. In a lubricating device having a compressed air passage and a lubricant reservoir associated therewith, a conduit transmitting pressure from the passage to the reservoir below the lubricant level, a check valve in the pressure conduit permitting flow from the passage to the reservoir but preventing flow of lubricant in the opposite direction, and a lubricant transmitting conduit connecting the reservoir adjacent the bottom thereof and the passage.

PARKER G. COX.
MAURICE BEN HEFTLER.

CERTIFICATE OF CORRECTION.

Patent No. 2,205,559.                           June 25, 1940.

MAURICE BEN HEFTLER, ET AL.

It is hereby certified that error appears in the printed specification of the above numbered patent requiring correction as follows: Page 2, first column, line 68, claim 2, for "reservoir above the lubricant" read --chamber and the passage--; same page, second column, line 11, claim 4, for the word "about" read --above--; and that the said Letters Patent should be read with this correction therein that the same may conform to the record of the case in the Patent Office.

Signed and sealed this 10th day of June, A. D. 1941.

(Seal)                                                      Henry Van Arsdale,
                                                             Acting Commissioner of Patents.